(12) United States Patent
Heathman et al.

(10) Patent No.: US 7,048,054 B2
(45) Date of Patent: *May 23, 2006

(54) CEMENT COMPOSITIONS CONTAINING COARSE BARITE, PROCESS FOR MAKING SAME AND METHODS OF CEMENTING IN A SUBTERRANEAN FORMATION

(75) Inventors: James F. Heathman, Houston, TX (US); Timothy L. Quirk, Lafayette, LA (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/987,632

(22) Filed: Nov. 12, 2004

(65) Prior Publication Data

US 2005/0098316 A1    May 12, 2005

Related U.S. Application Data

(63) Continuation of application No. 10/324,523, filed on Dec. 19, 2002, now Pat. No. 6,892,814.

(51) Int. Cl.
*E21B 33/13* (2006.01)

(52) U.S. Cl. .................. 166/292; 166/285; 106/816
(58) Field of Classification Search ............ 166/292, 166/285; 106/461, 816
See application file for complete search history.

(56) References Cited

U.S. PATENT DOCUMENTS

| | | | |
|---|---|---|---|
| 4,188,231 A | 2/1980 | Valore | 106/90 |
| 4,584,327 A | 4/1986 | Sutton | 523/130 |
| 4,935,060 A | 6/1990 | Dingsoyr | 106/719 |
| 5,879,110 A | 3/1999 | Carter, Jr. | 405/267 |
| 6,180,573 B1 | 1/2001 | Nattier et al. | 527/269 |
| 6,290,001 B1 | 9/2001 | West et al. | 175/61 |
| 6,465,048 B1 | 10/2002 | Toma et al. | 427/427 |

FOREIGN PATENT DOCUMENTS

EP    0 814 232 A2    12/1997

OTHER PUBLICATIONS

Paper entitled "Cementing" by Dwight K. Smith, pp. 27-29, 38 and 143-144, dated 1990.

(Continued)

*Primary Examiner*—John Kreck
(74) *Attorney, Agent, or Firm*—Craig W. Roddy; Conley Rose, P.C.

(57) ABSTRACT

Cement comprising barite, a process for preparing such cement, and methods of cementing in a subterranean formation or well bore using such cement are provided. The cement is prepared by introducing coarse barite to the cement, the course barite comprising particles having a particle size primarily greater than about 125 microns. The presence of the coarse barite in the cement causes the cement to have a relatively low viscosity. Introducing the barite to the cement also increases the density of the cement, thus rendering the cement capable of controlling high hydrostatic pressures in a well bore.

18 Claims, 1 Drawing Sheet

OTHER PUBLICATIONS

Halliburton brochure entitled "Hi-Dense® Weight Additives" dated 1998.

Halliburton brochure entitled "Micromax Weight Additive" dated 1999.

Halliburton brochure entitled "Barite Heavyweight Additive" dated 1999.

Baroid brochure entitled "BARAWEIGHT™ Weighting Agent" dated 1999.

Baroid brochure entitled "BARODENSE® Weighting Agent" dated 1996.

Baroid brochure entitled "Baroid® Weighting Agent" dated 1999.

Baroid brochure entitled "SWEEP-WATE™ Weighting Agent" dated 2000.

CEMENT COMPOSITIONS CONTAINING COARSE BARITE, PROCESS FOR MAKING SAME AND METHODS OF CEMENTING IN A SUBTERRANEAN FORMATION

CROSS-REFERENCE TO RELATED APPLICATIONS

This is a Continuation Application claiming priority to U.S. Pat. Ser. No. 10/324,523, filed Dec. 19, 2002 now U.S. Pat. No. 6,892,814 issued May 17, 2005 and entitled "Cement Compositions Containing Coarse Barite, Process For Making Same and Methods of Cementing in a Subterranean Formation," which is incorporated by reference herein in its entirety.

FIELD OF THE INVENTION

This invention generally relates to cementing in a subterranean formation or well bore. More specifically, the invention relates to a cement comprising coarse barite and a process for making the same.

BACKGROUND OF THE INVENTION

Well cementing is a process used in penetrating subterranean zones (also known as subterranean formations) to recover subterranean resources such as gas, oil, minerals, and water. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement and water is placed in the annulus and permitted to set into a hard mass (i.e., sheath) to thereby attach the string of pipe to the walls of the well bore and seal the annulus. Subsequent secondary cementing operations, e.g., completion and work over operations, may also be performed.

In some situations, the cement slurry is subjected to relatively high hydrostatic pressures in the well bore. As such, the density of the cement slurry needs to be sufficiently high to ensure that the cement can contain such high pressures. However, the density of conventional cement slurries containing Portland cement and water is often less than desired. One method developed for overcoming this limitation of conventional cement slurries is to increase the slurry density by adding a weighting material to the slurry. A weighting material is a material having a specific gravity higher than that of the other components in the slurry such as the Portland cement, which typically has a specific gravity in the range of 3.15 to 3.2. Commonly employed weighting materials are iron oxide (i.e., hematite) and manganese oxide (i.e., hausmannite). Hematite and hausmannite are commercially available from Halliburton Energy Services, Inc. under the trade names HI-DENSE® NO. 4 and MICRO-MAX, respectively, and they have an average specific gravity of 5.2 and 4.9, respectively.

In some situations, the weighting material is soluble in and thus can have an adverse effect on certain fluids in the well bore. For example, the high concentrations of soluble metal salts, such as those containing iron and manganese, in hematite and hausmannite, respectively, can contaminate certain types of brines used in completion and work over cementing operations. The presence of some weighting materials in a cement slurry also can undesirably cause the slurry to have a relatively high viscosity. Thus, the ability to pump the cement slurry into the well bore may be compromised by the use of the weighting material. A need therefore exists to develop a process for increasing the density of a cement slurry without risking contamination of fluids in the well bore and without compromising the ability of the slurry to be pumped. The present invention utilizes a new weighting material that does not adversely affect fluids in the well bore to form a pumpable cement slurry having a relatively high density.

SUMMARY OF THE INVENTION

The present invention includes cement comprising barite, a process for preparing such cement, and a methods of cementing in subterranean formations and well bores using such cement. The cement is prepared by introducing coarse barite, i.e., barite comprising particles having a particle size primarily greater than about 125 micrometers (microns), to the cement. Preferably, 90 percent of the barite particles is greater than about 125 microns in size. The presence of the coarse barite in the cement causes the cement to have a relatively low viscosity. As such, the cement can be mixed with a fluid to form a pumpable slurry that can be pumped into a well bore during well cementing. Introducing the barite to the cement also increases the density of cement, thus rendering the cement capable of controlling hydrostatic pressures in a well bore.

DESCRIPTION OF THE DRAWINGS

The invention, together with further advantages thereof, may best be understood by reference to the following description taken in conjunction with the accompanying drawing in which.

DETAILED DESCRIPTION OF THE PREFERRED EMBODIMENTS

Figure 1:
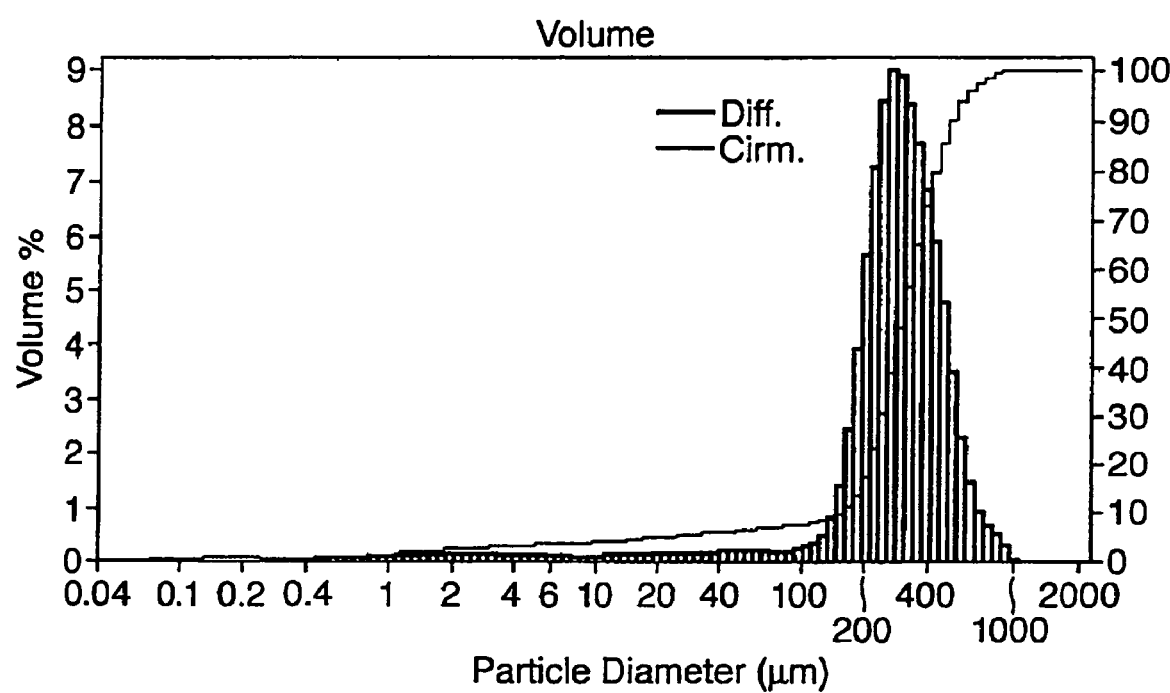
FIG. 1 illustrates the particle size distribution of a preferred course barite for use with the present invention.

In preferred embodiments, coarse barite is introduced to a cement to reduce its density. Barite is a common name for $BaSO_4$, i.e., barium sulfate. Barite that is added to drilling fluids during wellbore construction is generally manufactured by the guidelines set forth in American Petroleum Institute (API) Specification 13A, Fourteenth Edition, Aug. 1, 1991. This specification provides chemical and physical manufacturing requirements for barite to be used in drilling fluids. As used herein, coarse barite refers to barite, typically subjected to a crushing and screening process, having a particle size primarily greater than about 125 microns. Because the coarse barite has a relatively high specific gravity in the range of from about 4 to about 4.25, it serves as a weighting material that increases the density of the cement to in the range of from about 15 pounds (lbs)/gallon (gal) to about 23 lbs/gal, preferably from about 16 lbs/gal to about 21 lbs/gal, and more preferably from about 17 lbs/gal to about 20 lbs/gal. The viscosity of the resulting cement slurry depends on many factors, one of which is the average particle size distribution (PSD) of the barite. In particular, a larger PSD results in a lower slurry viscosity due to the smaller surface area associated with fewer particles. As such, the cement slurry containing the coarse barite is sufficiently viscous to be pumped into a well bore. Reducing rheologies in this manner is generally desirable, barring sacrificing of stability control. The coarse barite may also be used to marginally increase the thickening time of the slurry.

In some embodiments, the cement composition is prepared by first dry blending the coarse barite with any known cement. The cement may be any hydraulic cement composed of various species containing calcium, aluminum, silicon, oxygen, and/or sulfur which sets and hardens by reaction with water. Examples of suitable hydraulic cements are Portland cements, pozzolanic cements, gypsum cements, high alumina content cements, silica cements, and high alkalinity cements. The cement is preferably a Portland cement, more preferably a class A, B, C, G, or H Portland cement, and most preferably a class G or H Portland cement. A suitable coarse barite is commercially available from Halliburton Energy Services, Inc. (hereinafter "HES") under the tradename SWEEP-WATE™. This particular form of barite is coarsely ground such that about 90% of the barite particles have a particle size greater than about 125 microns. A preferred particle size distribution of the barite is shown in FIG. 1. In particular, FIG. 1 depicts the particle size distribution of SWEEP-WATE™ barite. The mean particle diameter and median particle diameter of SWEEP-WATE™ barite are about 305 microns and about 289 microns, respectively. Its specific surface area is about 4,566 cm$^2$/mL. As used herein, the symbol "%" represents the term "percent". The amount of coarse barite added to the cement can vary depending on the desired density of the cement slurry. For example, the amount of barite added to the cement may range from about 5% to about 100% by weight of the cement, more preferably from about 10% to about 70%, and yet more preferably from about 15% to about 50%.

The resulting cement/barite blend can be stored until it is desirable to place the blend in a well bore, at which point it can be transported to the location of the well bore. A sufficient amount of fluid is then added to the cement/barite blend to form a pumpable cementitious slurry. The fluid is preferably fresh water or salt water, i.e., an unsaturated aqueous salt solution or a saturated aqueous salt solution such as brine or seawater. The amount of water introduced to the cement/barite blend may vary but is a sufficient amount to provide a slurry and is preferably selected to provide a cement slurry having a desired density.

As deemed appropriate by one skilled in the art, additional additives may be introduced to the cement for improving or changing its properties. Examples of such additives include, but are not limited to, set retarders (e.g., SCR-100L retarder, which is commercially available from HES), fluid loss control additives (e.g., HALAD®-344 additive, which is commercially available from HES), defoamers (e.g., D-AIR 3000 defoamer, which is commercially available from HES), crystalline silica (e.g., SSA-2 silica flour, which is commercially available from HES), dispersing agents, set accelerators, and formation conditioning agents. Other weighting materials known in the art may also be added to the cement in conjunction with the coarse barite. The additives can be pre-blended with the cement and the barite before the addition of a fluid thereto. Alternatively, the additives can be introduced to the cement/barite blend concurrent with or after the addition of a fluid thereto.

In preferred embodiments, a well cementing process is performed using the cement slurry containing the coarse barite. The well cementing process includes drilling a well bore into a subterranean formation while circulating a drilling fluid through the well bore. A string of pipe, e.g., casing, is then run in the well bore. The drilling fluid is conditioned by circulating it downwardly through the interior of the pipe and upwardly through the annulus, which is located between the exterior of the pipe and the walls of the well bore. The cement slurry comprising coarse barite is then displaced down through the pipe and up through the annulus, where it is allowed to set into a hard mass. In alternative embodiments, the cement slurry may be used for other projects such as well bore plugging, remedial cementing, and masonry or building construction.

The presence of the coarse barite in the cement slurry provides several benefits. Having the ability to adjust the density of the slurry using the coarse barite ensures that the slurry can contain the hydrostatic pressures in the well bore. Due to the large average PSD of the coarse barite, less surface area is available for wetting in the cement slurry. As a result, the rheology of the slurry is much lower than if the cement had been mixed with a weighting agent having a smaller average PSD. Consequently, the cement slurry containing the coarse barite is easier to mix and experiences less friction during pumping than cement slurries containing conventional weighting materials.

It is also believed that the presence of the coarse barite in the cement slurry and the hardened cement formed therefrom favorably affects the mechanical properties in those materials. For example, the addition of the coarse barite may favorably impact Poisson's ratio, Young's modulus, the tensile strength, the tensile fracture energy, the friction angle, and the cohesion of the set cement.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

The cement slurries formed in the examples were prepared and tested, with the exception of the thickening time test, according to the API Recommended Practice, Specification 10B, 22$^{nd}$ Edition, December 1997.

Example 1

A cement slurry containing SWEEP-WATE™ barite in accordance with the present invention was formed. The amounts of the components in the cement slurry are presented in Table 1. The density, yield, thickening time, compressive strength, and operating free water value for the cement slurry were measured. These measurements are also shown in Table 1. The cement slurry was sheared at several different rotations per minute (RPM) to determine rheology data for the slurry at both 80° F. and 190° F. The rheology data was used to calculate the plastic viscosity and the yield point of the slurry, both of which are presented in Table 2.

Comparative Example 1

The procedure of Example 1 was followed except that HI-DENSE® conventional hematite weighting material was substituted for the barite weighting material. Also, a smaller amount of the HI-DENSE® material as compared to the SWEEP-WATE™ barite was required to form the same slurry density.

TABLE 1

| Component | Comparative Example 1 | Example 1 |
|---|---|---|
| Class H cement | 94 lbs | 94 lbs |
| SSA-2 crystalline silica | 35% bwoc* | 35% bwoc* |
| HALAD ® 344 EXP fluid loss control agent | 0.08 gal/sk* | 0.08 gal/sk* |
| D-AIR 3000 defoamer | 0.25% bwoc* | 0.25% bwoc* |
| SCR-100L set retarder | 0.1 gal/sk* | 0.1 gal/sk* |
| HI-DENSE ® No. 4 weighting material | 20 lbs | — |
| SWEEP-WATE ™ weighting material | — | 31 lbs |
| Mixing water (fresh) | 4.22 gal/sk* | 4.57 gal/sk* |
| Slurry Density | 18.4 lb/gal | 18.4 lb/gal |
| Slurry Yield | 1.37 ft$^3$/sk* | 1.43 ft$^3$/sk* |
| Thickening Time @ 219° F. & 14,600 psi | 3:32 (hr:min) | 3:55 (hr:min) |
| Operating Free Water | 0 mL | 0 mL |
| 12 Hour Compressive Strength @ 253° F. | 2,480 psi | 1,989 psi |
| 24 Hour Compressive Strength @ 253° F. | 2,950 psi | 2,730 psi |

*NOTE: bwoc = by weight of the cement; sk = sack

TABLE 2

| | | Comparative Example 1 | | | Example 1 | | | |
|---|---|---|---|---|---|---|---|---|
| | RPM | Dial Reading | RPM | Dial Reading | RPM | Dial Reading | RPM | Dial Reading |
| Rheology Data @ 80° F. | 600 | 600+ | 30 | 60 | 600 | 468 | 30 | 34 |
| | 300 | 480 | 20 | 42 | 300 | 252 | 20 | 24 |
| | 200 | 290 | 10 | 22 | 200 | 178 | 10 | 12 |
| | 100 | 172 | 6 | 14 | 100 | 96 | 6 | 8 |
| | 60 | 110 | 3 | 8 | 60 | 62 | 3 | 4 |
| | PV* | 450 | YP* | 15.7 | PV* | 240 | YP* | 14.1 |
| Rheology Data @ 190° F. | 600 | 402 | 30 | 30 | 600 | 198 | 30 | 16 |
| | 300 | 224 | 20 | 20 | 300 | 120 | 20 | 12 |
| | 200 | 158 | 10 | 10 | 200 | 82 | 10 | 6 |
| | 100 | 86 | 6 | 6 | 100 | 46 | 6 | 4 |
| | 60 | 54 | 3 | 4 | 60 | 28 | 3 | 2 |
| | PV* | 214 | YP* | 12.1 | PV* | 114 | YP* | 6 |

NOTE:
PV = plastic viscosity in centipoise units;
YP = yield point in lbs/100 ft$^2$ As shown in Table 1, the slurry containing the SWEEP-WATE™ barite (Example 1) exhibited a longer thickening time and a higher volumetric yield than the slurry containing HI-DENSE® material (Comparative Example 1). In addition, the compressive strengths of the slurry containing the SWEEP-WATE™ barite were comparable to the compressive strengths of the slurry containing HI-DENSE® material, with the 24 hour compressive strength being more similar than the 12 hour compressive strength. Further, as shown in Table 2, the actual RPM's (i.e., the dial readings) of the slurry containing SWEEP-WATE™ barite were lower than those of the slurry containing HI-DENSE® material. The plastic viscosity of the slurry containing SWEEP-WATE™ barite was also significantly less than that of the slurry containing HI-DENSE® material. Moreover, the yield point of the slurry containing SWEEP-WATE™ barite was lower than that of the slurry containing HI-DENSE® material.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claims.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of cementing in a subterranean formation comprising the steps of:

preparing a pumpable cement slurry comprising barite having particles with a particle size primarily greater than about 125 microns, wherein the cement slurry has a density in a range of from about 15 lbs/gal to 23 lbs/gal;

pumping the slurry into the subterranean formation; and allowing the slurry to set.

2. The method of claim 1 wherein said step of preparing the pumpable cement slurry comprises blending the barite with a hydraulic cement.

3. The method of claim 1 wherein said step of preparing the pumpable cement slurry comprises adding a sufficient amount of water to form the cement slurry.

4. The method of claim 1 wherein about 90% of the particles are greater than about 125 microns in size.

5. The method of claim 1 wherein the barite is present in the cement slurry in an amount of about 5 to about 60 weight % based on the total weight of cement therein.

6. The method of claim 1 wherein the cement slurry further comprises at least one of crystalline silica, a fluid loss control agent, a retarding agent, and a defoamer.

7. A method of cementing in a subterranean formation comprising the steps of:
preparing a cement composition comprising hydraulic cement, water present in an amount sufficient to provide a pumpable slurry, and barite, wherein the cement slurry has a density in a range of from about 15 lbs/gal to 23 lbs/gal and wherein the barite comprises particles about 90% of which are greater than about 125 microns in size;
pumping the slurry into the subterranean formation; and allowing the slurry to set.

8. The method of claim 7 wherein the barite is present in the cement slurry in an amount of about 5 to about 60 weight % based on the total weight of cement therein.

9. The method of claim 7 wherein the cement slurry further comprises at least one of crystalline silica, a fluid loss control agent, a retarding agent, and a defoamer.

10. A process of preparing cement for use in a well bore comprising the step of introducing barite to the cement wherein the barite comprises particles having a particle size primarily greater than about 125 microns and wherein a density of the cement slurry is in a range of from about 15 lbs/gal to 23 lbs/gal.

11. The process of claim 10 wherein about 90% of the particles is greater than about 125 microns in size.

12. The process of claim 10 wherein from about 5 to about 100 weight % barite based on the total weight of the cement is introduced to the cement.

13. The process of claim 10 further comprising the step of mixing a fluid with the cement and the barite to form a cement slurry.

14. The process of claim 10 further comprising the step of introducing at least one of crystalline silica, a fluid loss control agent, a retarding agent, and a defoamer to the cement.

15. A pumpable cement slurry comprising:
a hydraulic cement;
barite comprising particles having a particle size primarily greater than about 125 microns; and
water;
wherein the cement slurry has a density in a range of from about 15 lbs/gal to 23 lbs/gal.

16. The cement composition of claim 15 wherein about 90% of the particles is greater than about 125 microns in size.

17. The cement composition of claim 15 wherein the barite is present in the cement composition in an amount of about 5 to about 60 weight % based on the total weight of the cement.

18. The cement composition of claim 15 further comprising at least one of crystalline silica, a fluid loss control agent, a retarding agent, and a defoamer.

* * * * *